United States Patent
Tippetts

(10) Patent No.: US 10,416,935 B2
(45) Date of Patent: Sep. 17, 2019

(54) METHOD AND APPARATUS TO PROCESS A PRINT JOB

(75) Inventor: Ronald Tippetts, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 401 days.

(21) Appl. No.: 13/479,502

(22) Filed: May 24, 2012

(65) Prior Publication Data

US 2013/0314739 A1   Nov. 28, 2013

(51) Int. Cl.
*G06K 15/02* (2006.01)
*G06F 3/12* (2006.01)
*H04N 1/32* (2006.01)

(52) U.S. Cl.
CPC ............ *G06F 3/1213* (2013.01); *G06F 3/126* (2013.01); *G06F 3/1284* (2013.01); *H04N 1/32523* (2013.01); *H04N 1/32545* (2013.01); *H04N 2201/0082* (2013.01)

(58) Field of Classification Search
CPC ........... G06K 15/02; G06F 15/20; G06F 3/12; G06F 15/00
See application file for complete search history.

(56) References Cited

U.S. PATENT DOCUMENTS

| | | | | |
|---|---|---|---|---|
| 5,157,765 A | * | 10/1992 | Birk et al. | .................... 345/506 |
| 8,141,088 B2 | * | 3/2012 | Morishita | ............. G06F 9/3802 |
| | | | | 712/215 |
| 2005/0146742 A1 | * | 7/2005 | Gregory | ................ G06F 3/1211 |
| | | | | 358/1.15 |
| 2005/0231747 A1 | * | 10/2005 | Bledsoe | ................ G06F 3/1203 |
| | | | | 358/1.13 |
| 2006/0274350 A1 | * | 12/2006 | Barry | ..................... B41J 29/393 |
| | | | | 358/1.13 |
| 2006/0274370 A1 | * | 12/2006 | Shima | ................... G06F 3/1204 |
| | | | | 358/1.15 |
| 2008/0007754 A1 | * | 1/2008 | Torii | ...................... G06K 15/02 |
| | | | | 358/1.12 |
| 2009/0244582 A1 | * | 10/2009 | Shestak | .................. G06K 15/02 |
| | | | | 358/1.13 |
| 2010/0053664 A1 | | 3/2010 | Mandel et al. | |

* cited by examiner

*Primary Examiner* — Frantz Bataille
(74) *Attorney, Agent, or Firm* — HP Inc. Patent Department

(57) ABSTRACT

A method of processing a print job where a distribution strategy is determined for how a print job is to be distributed to a plurality of image processors for image processing based on at least one predetermined rule, and where distribution of the print job to at least one image processor of the plurality of image processors is controlled using the determined distribution strategy.

20 Claims, 4 Drawing Sheets

METHOD AND APPARATUS TO PROCESS A PRINT JOB

BACKGROUND

A printing system may include an image processor, such as a raster image processor, for image processing a print job, and a printer for printing the image processed print job. However, such a printing system has a limited rate at which it may image process and print the print job. Furthermore, if the image processor and/or the printer develop a fault, the processing of the print job may be delayed.

BRIEF DESCRIPTION

Reference will now be made by way of example only to the accompanying drawings in which.

DETAILED DESCRIPTION

In the following description, the wording 'connect' and 'couple' and their derivatives mean operationally connected or coupled. It should be appreciated that any number or combination of intervening components can exist (including no intervening components).

Figure 1:
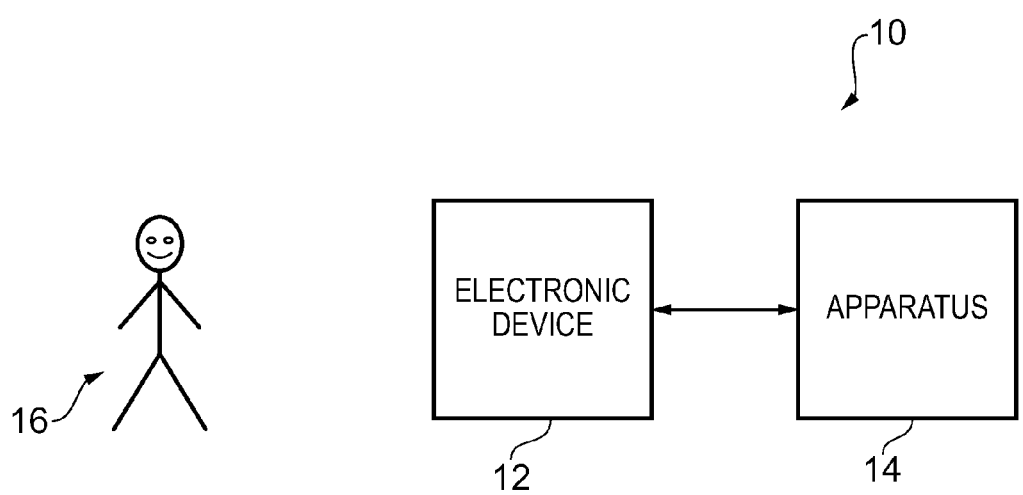
FIG. 1 illustrates a schematic diagram of a printing system according to an example of the invention.

FIG. 1 illustrates a schematic diagram of a printing system 10 according to an example. The printing system 10 includes an electronic device 12 and an apparatus 14. The electronic device 12 and the apparatus 14 may be located remotely from one another (for example, they may be located in different buildings, different cities or in different countries) or may be located in close proximity to one another such that the electronic device 12 may be considered part of the apparatus 14.

The electronic device 12 may be any suitable electronic device for generating a print job and providing the print job to the apparatus 14. For example, the electronic device 12 may be a desktop personal computer, a laptop personal computer, a handheld electronic device such as a mobile cellular telephone or a tablet computer.

The term 'print job' refers to a file or a plurality of files that have been submitted to be printed. A print job may require image processing (such as rastering) in order to convert the print job into a format that may be printed by a printer.

The apparatus 14 is described in detail in the following paragraphs with reference to FIGS. 2 to 4. Briefly, the apparatus 14 is arranged to receive the print job from the electronic device 12, image process the print job and then print the print job.

In operation, a user 16 may operate the electronic device 12 to generate a print job. For example, the user 16 may use a desktop publishing program or a word processing program on the electronic device 12 to create or edit a document and then select a print option to generate a print job for the document. The electronic device 12 then provides the print job to the print apparatus 14 for image processing and printing. The printed work item may then be collected by the user 16, or may be posted to the user (this may be the case where the apparatus 14 is located remotely from the electronic device 12).

Figure 2:
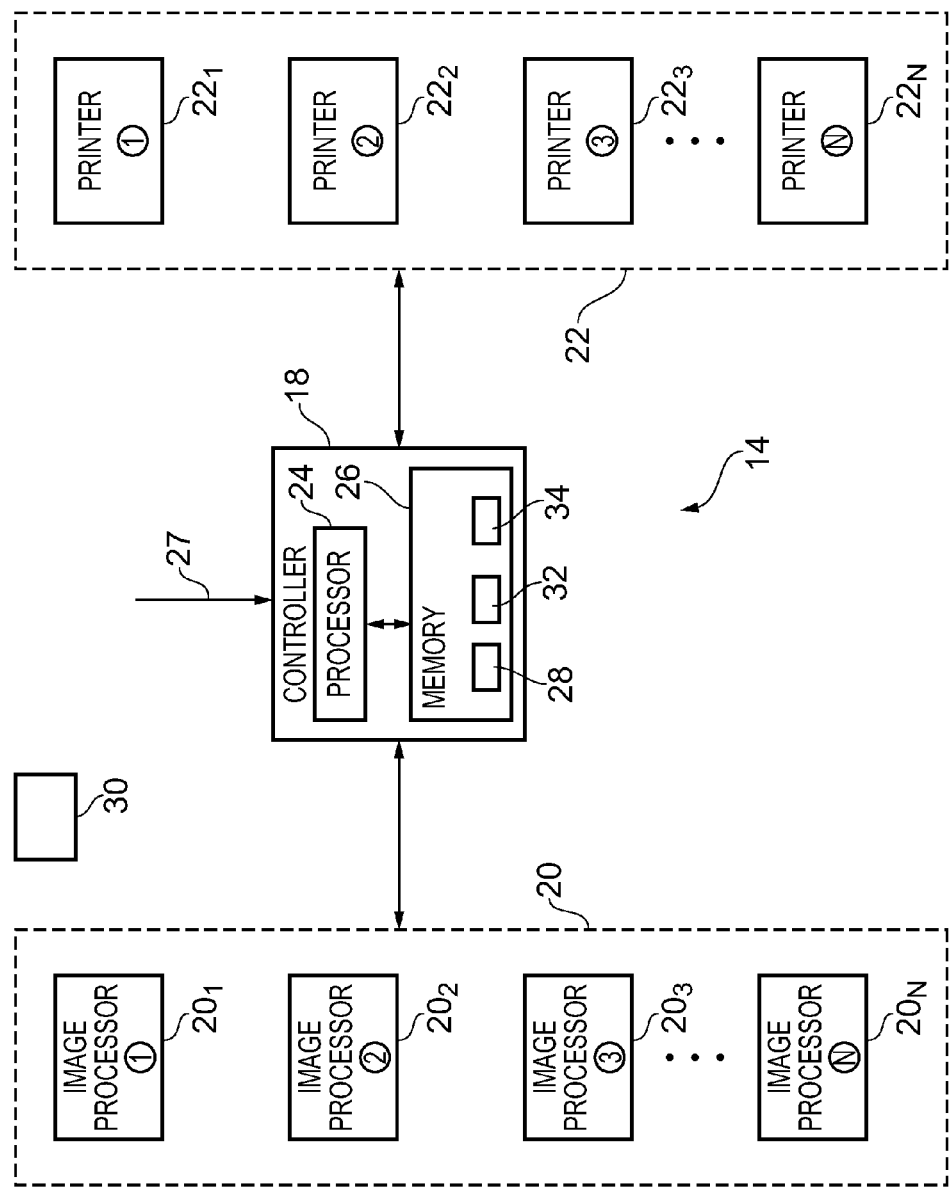
FIG. 2 illustrates a schematic diagram of an apparatus according to an example of the invention.

FIG. 2 illustrates an apparatus 14 according to an example. The apparatus 14 includes a controller 18, a plurality of image processors 20, and a plurality of printers 22.

The implementation of the controller 18 can be in hardware alone (for example, a circuit, a processor and so on), have certain aspects in machine readable instructions including firmware alone or can be a combination of hardware and software (including firmware).

The controller 18 may be implemented using instructions that enable hardware functionality, for example, by using executable computer program instructions in a general-purpose or special-purpose processor 24 that may be stored on a computer readable storage medium 26 (disk, memory and so on) to be executed by such a processor 24.

The processor 24 is configured to read from and write to the memory 26. The processor 24 may also comprise an output interface via which data and/or commands are output by the processor 24 and an input interface via which data and/or commands are input to the processor 24. The processor 24 is configured to receive print jobs from the electronic device 12 via the signal 27. Where the electronic device 12 is part of the apparatus 14, the processor 24 and the memory 26 may be part of the electronic device 12.

The memory 26 stores a computer program 28 comprising computer program instructions that control the operation of the apparatus 14 when loaded into the processor 24. The computer program instructions 28 provide the logic and routines that enables the apparatus 14 to perform the methods illustrated in FIGS. 3 and 4. The processor 24 by reading the memory 26 is able to load and execute the computer program 28.

The computer program 28 may arrive at the apparatus 14 via any suitable delivery mechanism 30. The delivery mechanism 30 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 28. The delivery mechanism may be a signal configured to reliably transfer the computer program 28. The apparatus 14 may propagate or transmit the computer program 28 as a computer data signal.

Although the memory 26 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' and so on, or a 'controller', 'computer', 'processor' and so on should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code and so on should be understood to encompass software for a programmable processor or firmware such as, for example, the programmable content of a hardware device whether instructions for a processor, or configuration settings for a fixed-function device, gate array or programmable logic device and so on.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

The plurality of image processors 20 includes a first image processor $20_1$, a second image processor $20_2$, a third image processor $20_3$ and so on until an Nth image processor $20_N$. It should be appreciated that the plurality of image processors 20 may include any number of image processors greater than one. The plurality of image processors 20 may be a plurality of physically separate processors, or may be a single processor that is arranged to function as a plurality of processors.

The plurality of image processors 20 are arranged to receive print jobs from the controller 18, to image process the print jobs and to then provide the image processed print jobs to the controller 18. The controller 18 is arranged to monitor the performance of the plurality of image processors 20 at image processing the print jobs and to generate data for the monitored performance.

In this example, the plurality of image processors 20 are a plurality of raster image processors (RIPs) that are arranged to raster a print job. In other examples, the plurality of image processors 20 may be arranged to perform different types of image processing. For example, the plurality of image processors 20 may be arranged to re-sample the print job or convert the print job from one format to another format (for example, from PDF to TIF). In some embodiments, the plurality of image processors 20 are arranged to perform a plurality of image processing functions on a print job (for example, the image processors 20 may raster the print job and convert the print job format).

The plurality of printers 22 may include any suitable printers and may include, for example, laser printers, ink jet printers, LED printers and/or lithographic printers. The plurality of printers 22 includes a first printer $22_1$, a second printer $22_2$, a third printer $22_3$ and so on until an Nth printer $22_N$. It should be appreciated that the plurality of printers 22 may include any number of printers greater than one.

The plurality of printers 22 are arranged to receive and print image processed print jobs from the controller 18. The controller 18 is arranged to monitor the performance of the plurality of printers 22 at printing the image processed print jobs.

The memory 26 stores a first set of predetermined rules 32 that enable the controller 18 to determine a distribution strategy for how a print job is to be distributed among the plurality of image processors 20. The first set of predetermined rules 32 may be stored on the memory 26 at the time of manufacture, or may be determined by the user 16 (that is, the user creates the first set of predetermined rules 32 and stores them on the memory 26). It should be appreciated that the first set of predetermined rules 32 may include any number of rules, and may include a single rule.

The first set of predetermined rules 32 may include at least one of the following rules:

1. Varying the Number of Image Processors 20 to Process a Print Job in Dependence on the Rate of Image Processing of the Print Job In one rule, the controller 18 monitors the rate of image processing of a print job, and if the rate of image processing falls below a threshold value, the controller 18 determines a distribution strategy in which the print job is distributed to a greater number of image processors 20. In another rule, the controller 18 analyses a print job upon receipt and determines the number of image processors 20 required to image process the print job within a target time or at a target rate. The controller 18 then determines a distribution strategy in which the print job is distributed to a number of image processors 20 that are sufficient to meet the target time or target rate.

2. Varying the Number of Image Processors to Process the Print Job in Dependence on the Priority of the Print Job In one rule, the controller 18 analyses the print job upon receipt to determine the priority of the print job. If the priority of the print job is high, the controller 18 determines a distribution strategy in which the print job is distributed to a greater number of image processors 20 (relative to the number of image processors for normal priority). If the priority of the print job is low, the controller 18 determines a distribution strategy in which the print job is distributed to a lower number of image processors (relative to the number of image processors for normal priority).

3. Varying the Number of Image Processors to Process the Print Job in Dependence on a Characteristic of the Print Job In one rule, the controller 18 analyses the print job upon receipt to determine whether the print job has a characteristic or characteristics that, for example, increase the image processing complexity, duration for printing, or importance of the print job. If the print job has such a characteristic, the controller 18 determines a distribution strategy in which the print job is distributed to a greater number of image processors 20 (relative to the number of image processors for a print job with no such characteristics). Examples of print job characteristics include, but are not limited to, copy counts (that is, the number of individual copies that are to be printed), priority of the print job (as described above), the submitter of the print job, service level agreement (which may include time based fulfillment commitments) and due dates for the print job.

4. Varying the Number of Image Processors to Process the Print Job in Dependence on a Characteristic of a Payload of the Print Job Print jobs have file resources and the predetermined rules 32 may be rules based on the characteristics in those file resources. Examples of payload characteristics include, but are not limited to, color spaces, font construction and/or embedding, transparency use, image compression, page count (that is, the number of pages in the file) and the physical file size of the memory. For example, if the controller 18 determines that the print job is in color, the controller 18 determines a distribution strategy in which the print job is distributed to a greater number of image processors 20 (relative to the number of image processors for a black and white print job).

5. Change at Least One of the Image Processors where at Least One Default Image Processor is Performing Poorly For example, a default image processor may have a fault known to the controller 18, and the controller 18 determines a distribution strategy in which the print job is distributed to a set of image processors that does not include the default image processor.

6. Change at Least One of the Image Processors Where at Least One Image Processor Fails For example, if the controller 18 determines (through monitoring the image processors 10) that at least one image processor 20 has failed, the controller 18 determines a distribution strategy in which the print job is distributed to a set of image processors that does not include the failed image processors.

The memory 26 also stores a second set of predetermined rules 34 that enable the controller 18 to determine a distribution strategy for how a print job is to be distributed among the plurality of printers 22. The second set of predetermined rules 34 may be stored on the memory 26 at the time of manufacture, or may be determined by the user 16 (that is, the user creates the second set of predetermined rules 34 and stores them on the memory 26). It should be appreciated that the second set of predetermined rules 34 may include any number of rules, and may include a single rule.

The second set of predetermined rules 34 are similar to the first set of predetermined rules 32. For example, if the priority of the print job is high, the controller 18 determines a print distribution strategy which increases the number of printers 22 that the print job is distributed to. By way of another example, if the controller 18 monitors the printers 22 and determines that the rate of printing is below a threshold value, the controller 18 determines a print distribution strategy which increases the number of printers 22 that the print job is distributed to.

Figure 3:
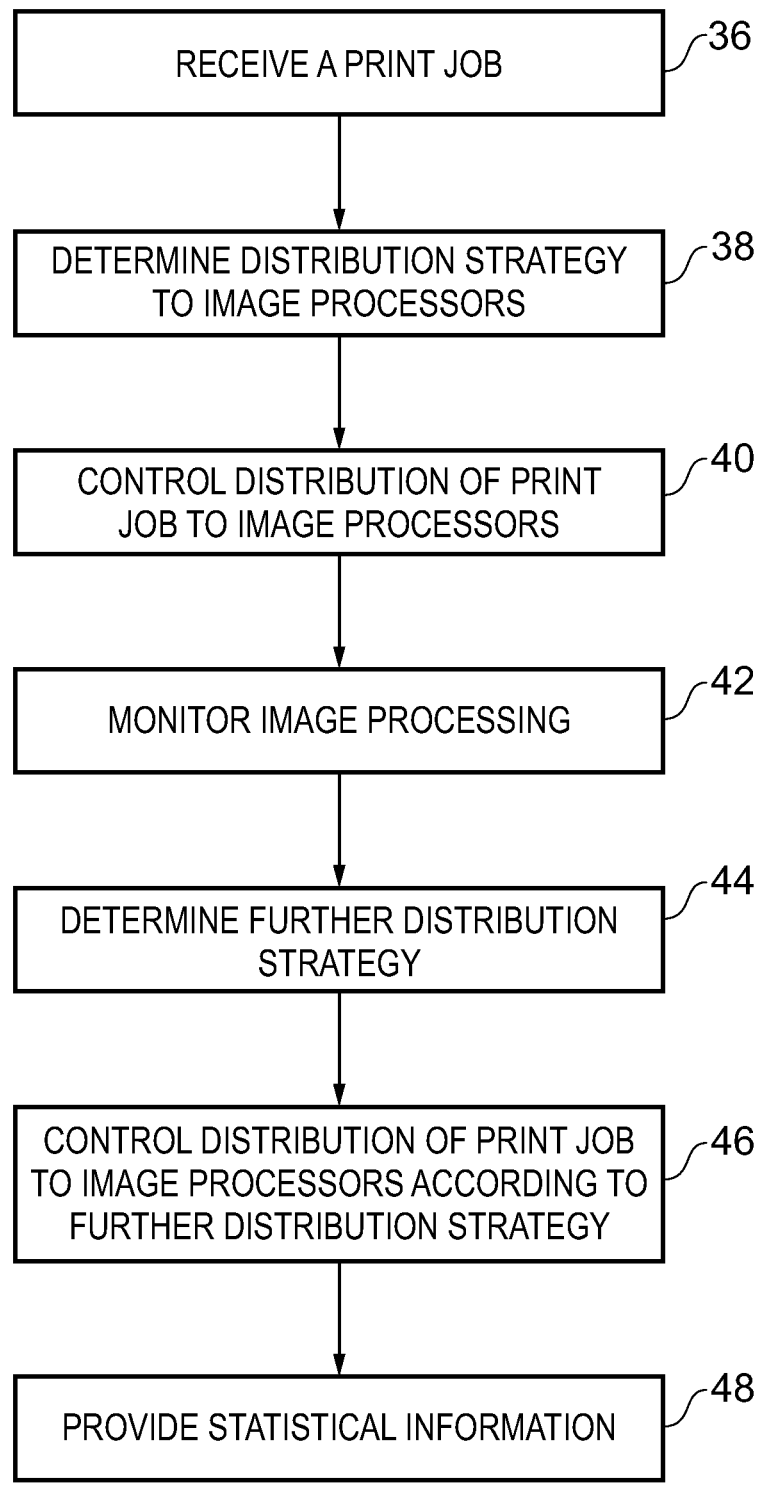
FIG. 3 illustrates a flow diagram of a method according to an example of the invention.

FIG. 3 illustrates a flow diagram of a method of processing a print job according to an example.

At block 36, the apparatus 14 receives a print job from the electronic device 12.

At block 38, the controller 18 determines a distribution strategy of how the print job is to be distributed to the plurality of image processors 20 for image processing based on at least one predetermined rule of the first set of predetermined rules 32. For example, the controller 18 may determine that the print job has a high priority and determines a distribution strategy in which the print job is to be distributed to N−1 image processors 20 of the plurality of image processors 20.

At block 40, the controller 18 controls the distribution of the print job to the image processors 20 in the determined distribution strategy. For example, where the distribution strategy is for the print job to be distributed to N−1 of the image processors 20, the controller 18 controls the distribution of the print job to N−1 of the image processors 20.

At block 42, the controller 18 monitors the image processing performed by the image processors 20 and generates data. It should be appreciated that block 42 may be performed continuously while the image processors 20 are image processing the print job.

At block 44, the controller 18 determines a further distribution strategy of how the print job is to be distributed to the plurality of image processors 20 for image processing based on the at least one predetermined rule of the first set of predetermined rules 32 and the data generated in block 42. For example, the data generated in block 42 may include the rate at which the print job is being processed by the N−1 image processors 20. If the monitored rate is below a threshold value, the controller 18 determines a further distribution strategy in which the print job is to be distributed to N image processors 20 (that is, the print job is to be distributed to all of the image processors 20).

At block 46, the controller 18 controls the distribution of the print job to at least one different image processor of the plurality of image processors 20 using the determined further distribution strategy. For example, the controller 18 controls the distribution of the print job to N image processors 20 (that is, to all of the image processors 20).

At block 48, the controller 18 uses the data generated in block 42 to provide statistical information. The statistical information may be provided at any time (for example, in response to a user request) and/or may be provided in response to the completion of the image processing of the print job. The statistical information may enable the user 16 to review how the apparatus 14 is processing print jobs and to determine if there are any inherent inefficiencies in the operation of the apparatus 14. If the user 16 determines that the apparatus 14 has inefficiencies, the user 16 may change the first set of predetermined rules 32 to remove the inefficiencies. For example, the user may review the statistical information and learn that image processor $20_2$ is processing slowly relative to the other image processors 20. The user 16 may then change the first set of predetermined rules 32 so that image processor $20_2$ is not used for high priority print jobs.

Various examples provide an advantage in that the controller 18 may dynamically allocate and de-allocate image processors 20 to image process a print job according to the first set of predetermined rules 32. This may result in efficient use of the plurality of image processors 20 according to a user's preference. Since the controller 18 may monitor the image processing of the print job in real time (that is, the image processing of the print job is monitored while it is being performed), the controller 18 may advantageously change the image processors 20 being used in real time if an image processor 20 is performing slowly or fails.

Figure 4:
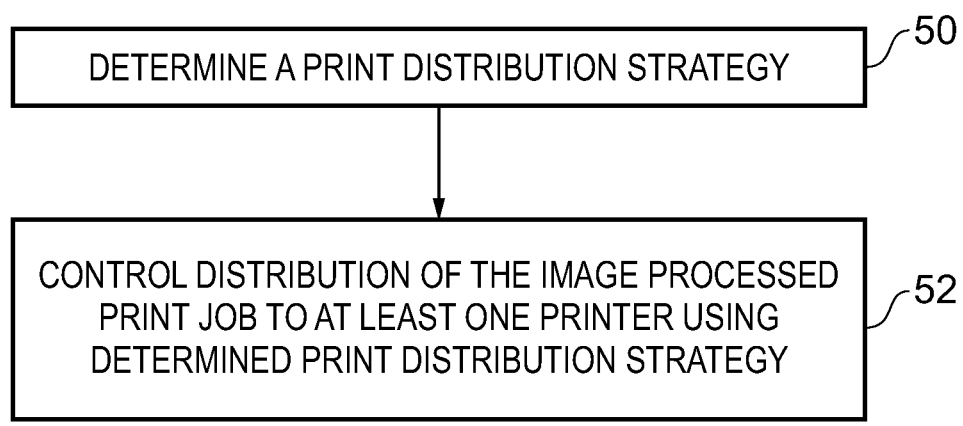
FIG. 4 illustrates a flow diagram of another method according to an example of the invention.

FIG. 4 illustrates a flow diagram of another method according to various examples.

At block 50, the controller 18 determines a print distribution strategy of how an image processed print job is to be distributed to the plurality of printers 22 based on at least one predetermined rule of the second set of predetermined rules 34. For example, if the image processed print job is of high priority, the controller 18 may determine a print distribution strategy in which the print job is to be distributed to N printers 22 of the plurality of printers (that is, the print job is to be distributed to all of the printers 22).

At block 52, the controller 18 controls distribution of the image processed print job to at least one printer of the plurality of printers 22 using the determined print distribution strategy. For example, if the determined print distribution strategy specifies that the print job is to be distributed to N printers, the controller 18 controls distribution of the print job to N printers.

In some embodiments, the controller 18 monitors the printing performed by the printers 22 and dynamically allocates and de-allocates printers to the print job if the data generated by the monitoring satisfies at least one of the second set of predetermined rules. For example, if the monitored rate of printing of printer $22_2$ falls below a threshold value, the controller 18 may de-allocate printer $22_2$ and allocate a different printer in its place.

Various examples may provide an advantage in that since the apparatus 14 may be located remotely from the electronic device 12, the methods illustrated in FIGS. 3 and 4 may be performed remotely from the user 16. In some examples, the methods illustrated in FIGS. 3 and 4 may be performed remotely by a third party company as a business service. This may be advantageous where the user 16 (or the company of user 16) does not have sufficient image processing capacity and/or printing capacity on site.

The blocks illustrated in the FIGS. 3 and 4 may represent steps in a method and/or sections of code in the computer program 28. The illustration of a particular order to the blocks does not necessarily imply that there is a required or preferred order for the blocks and the order and arrangement of the block may be varied. Furthermore, it may be possible for some blocks to be omitted.

Although examples have been described in the preceding paragraphs, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A method of processing a print job, the method comprising:
   determining, by a controller, an image processor distribution strategy of how a print job is to be distributed to multiple image processors of a plurality of image processors for image processing based on a first predetermined rule;
   varying a number of image processors to process the print job based on the first predetermined rule;
   controlling distribution of the print job to the multiple image processors of the plurality of image processors using the determined image processor distribution strategy for the print job;
   receiving from the multiple image processors an image processed print job;
   determining, by the controller, a printer distribution strategy of how the image processed print job is to be distributed to a plurality of printers based on a second predetermined rule; and
   controlling distribution of the image processed print job to a printer of the plurality of printers using the determined printer distribution strategy for the image processed print job.

2. A method as claimed in claim 1, further comprising:
   monitoring image processing of the print job by the multiple image processors to generate data;
   determining a further distribution strategy of how the print job is to be distributed to the plurality of image processors for image processing based on the first predetermined rule and the generated data; and
   controlling distribution of the print job to a different image processor of the plurality of image processors using the determined further distribution strategy.

3. A method as claimed in claim 1, further comprising:
   monitoring image processing of the print job by the multiple image processor to generate data; and
   providing statistical information using the generated data.

4. A method as claimed in claim 1, wherein the print job is generated at a location remote from the plurality of image processors.

5. A method as claimed in claim 1, wherein the first predetermined rule and the second predetermined rule are determined by a user.

6. A method as claimed in claim 1, wherein the first predetermined rule includes a rule selected from the group consisting of:
   varying a number of image processors to process the print job in dependence on the rate of image processing of the print job; and
   varying the number of image processors to process the print job in dependence on the priority of the print job; and
   varying the number of image processors to process the print job in dependence on a characteristic of the print job; and
   varying the number of image processors to process the print job in dependence on a characteristic of a payload of the print job.

7. A method as claimed in claim 1, wherein the plurality of image processors includes a plurality of raster image processors.

8. Apparatus to process a print job, comprising:
   a processor; and
   memory including computer program code;
   the memory and the computer program code to, with the processor, cause the apparatus to:
   determine an image processor distribution strategy of how a print job is to be distributed to multiple image processors of a plurality of image processors for image processing based on a first predetermined rule;
   vary a number of image processors to process the print job based on the first predetermined rule;
   control distribution of the print job to the multiple image processors of the plurality of image processors using the determined image processor distribution strategy for the print job;
   receive, at a controller, an image processed print job from at multiple image processors;
   determine a printer distribution strategy of how the image processed print job is to be distributed to multiple printers of a plurality of printers based on a second predetermined rule;
   control distribution of the image processed print job to the multiple printers of the plurality of printers using the determined printer distribution strategy for the image processed print job;
   monitor image processing of the print job by the multiple image processors to generate data; and
   change the first predetermined rule to exclude a particular processor from processing a high priority print job based on generated data.

9. Apparatus as claimed in claim 8, wherein the first predetermined rule varies a number of image processors to process the print job in dependence on the rate of image processing of the print job to achieve a target processing rate.

10. Apparatus to raster a print job, comprising:
a plurality of raster image processors to raster the print job;
a controller to:
   dynamically allocate multiple raster image processors of the plurality of raster image processors to raster the print job based on a first predetermined rule, in which the first predetermined rule varies a number of raster image processors to process the print job;
   distribute the print job among the multiple raster image processors;
   receive from the multiple raster image processors a rastered print job;
   redistribute, during image processing, the print job based on a further distribution strategy;
   monitor image processing of the print job by the multiple image processors to generate data; and
   change the first predetermined rule to exclude a particular processor from processing a high priority print job based on generated data; and
a plurality of printers to print the rastered print job, the controller being arranged to dynamically allocate multiple of the plurality of printers to print the rastered print job in dependence on a second predetermined rule.

11. Apparatus as claimed in claim 10, wherein the controller and the plurality of raster image processors are located remote from one another.

12. Apparatus as claimed in claim 10, wherein the first predetermined rule includes a rule selected from the group consisting of:
   varying the number of raster image processors to process the print job in dependence on the rate of image processing of the print job; and
   varying the number of raster image processors to process the print job in dependence on the priority of the print job; and
   varying the number of raster image processors to process the print job in dependence on a characteristic of the print job; and
   varying the number of raster image processors to process the print job in dependence on a characteristic of a payload of the print job.

13. Apparatus as claimed in claim 10, further comprising:
a processor; and
memory including computer program code, wherein the memory and the computer program code to, with the processor, cause the apparatus at least to:
   monitor raster image processing of the print job by the multiple raster image processors to generate data indicating a rate at which the print job is being processed;
   determine a further distribution strategy of how the print job is to be distributed to the plurality of raster image processors for image processing based on the predetermined rule and the generated data; and
   control distribution of the print job to a different raster image processor of the plurality of raster image processors using the determined further distribution strategy.

14. An apparatus as claimed in claim 10, wherein the predetermined rules differ from each other.

15. The method of claim 1, further comprising converting the print job from one format into another format.

16. The apparatus of claim 8, wherein the first predetermined rule varies a number of image processors to process the print job in dependence on a priority of the print job.

17. The apparatus of claim 8, wherein the first predetermined rule varies a number of image processors to process the print job in dependence on a characteristic of the print job.

18. The apparatus of claim 8, wherein the first predetermined rule varies a number of image processors to process the print job in dependence on a characteristic of a payload of the print job.

19. The apparatus of claim 8, wherein the first predetermined rule changes of the image processors based on image processor performance.

20. The apparatus of claim 8, wherein the plurality of image processors comprises image processors to perform different types of image processing.

* * * * *